US012088031B2

(12) United States Patent
Goren

(10) Patent No.: US 12,088,031 B2
(45) **Date of Patent: *Sep. 10, 2024**

(54) QUICK INSTALL BANANA PLUG

(71) Applicant: Speaker Snap LLC, Fishers, IN (US)

(72) Inventor: Richard H. Goren, Fishers, IN (US)

(73) Assignee: Speaker Snap LLC, Fishers, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,131

(22) Filed: Aug. 31, 2023

(65) Prior Publication Data

US 2023/0411890 A1 Dec. 21, 2023

Related U.S. Application Data

(63) Continuation of application No. 17/935,359, filed on Sep. 26, 2022, now Pat. No. 11,749,927.

(60) Provisional application No. 63/268,825, filed on Mar. 3, 2022.

(51) Int. Cl.

*H01R 4/00* (2006.01)
*H01R 13/24* (2006.01)
*H01R 101/00* (2006.01)

(52) U.S. Cl.

CPC ..... *H01R 13/2457* (2013.01); *H01R 13/2471* (2013.01); *H01R 2101/00* (2013.01); *H01R 2201/16* (2013.01)

(58) Field of Classification Search

CPC .. H01R 4/2433; H01R 4/2404; H01R 4/2412; H01R 4/40; H01R 2103/00; H01R 4/2491; H01R 4/4845

See application file for complete search history.

(56) References Cited

U.S. PATENT DOCUMENTS 4,468,083 A 8/1984 Lee et al.
4,824,405 A * 4/1989 Derain .................. H01R 24/28 439/825
6,261,120 B1 * 7/2001 Beege ................ H01R 4/48365 439/441
6,447,333 B1 9/2002 Springer
6,893,286 B2 5/2005 Drewes et al.

(Continued)

FOREIGN PATENT DOCUMENTS

KR 200434573 Y1 12/2006

OTHER PUBLICATIONS

PCT, Int. App. No. PCT/US2022/077738 Written Opinion of the International Searching Authority, 7 pages, Jan. 10, 2023.

(Continued)

*Primary Examiner* — Phuong Chi Thi Nguyen
(74) *Attorney, Agent, or Firm* — Woodard, Emhardt, Henry, Reeves & Wagner, LLP

(57) ABSTRACT

A banana plug including a body, a male portion, a female portion, and a lever. The male portion is configured to extend from the body to electrically connect with a receptacle. In one example, the receptacle is a piece of audio/video (AV) equipment. The female portion is configured to receive a wire and/or other electrical component. The lever is configured to actuate between an open position and a closed position. In the open position, the lever is configured to actuate an internal spring to receive a wire. In the closed position, the lever is configured to release the internal spring to secure and/or retain the wire via a compression force.

19 Claims, 16 Drawing Sheets

(56) References Cited

U.S. PATENT DOCUMENTS

| | | | | |
|---|---|---|---|---|
| 10,014,596 | B2 * | 7/2018 | Hartmann | H01R 13/50 |
| 11,024,987 | B2 | 6/2021 | Koellmann et al. | |
| 11,043,759 | B2 | 6/2021 | Ober-Woerder | |
| 11,749,927 | B1 * | 9/2023 | Goren | H01R 13/2457<br>439/625 |
| 2003/0073356 | A1 * | 4/2003 | Victor | H01R 4/4881<br>439/864 |
| 2003/0124916 | A1 | 7/2003 | Mano et al. | |
| 2021/0143560 | A1 | 5/2021 | Koellmann | |

OTHER PUBLICATIONS

PCT, Intl. App. No. PCT/US2022/077738 International Search Report, 5 pages, Jan. 10, 2023.

* cited by examiner

QUICK INSTALL BANANA PLUG

CROSS REFERENCE TO RELATED APPLICATIONS

This application is a continuation of U.S. patent application Ser. No. 17/935,359, filed Sep. 26, 2022, which is hereby incorporated by reference. U.S. patent application Ser. No. 17/935,359, filed Sep. 26, 2022, claims the benefit of U.S. Patent Application No. 63/268,825, filed Mar. 3, 2022, which are hereby incorporated by reference.

BACKGROUND

One common issue electricians and do-it-yourselfers (DIYers) often face when working with electrical equipment are loose or faulty electrical connections. For instance, when hooking up audio/video (AV) components, such as stereos, speakers, televisions, and the like, a loose connection can lead to poor or intermittently poor signal quality which in turn results in an overall poor audio and/or video experience. These loose connections can also result in electrical shorts which can be quite dangerous.

Thus, there is a need for improvement in this field.

SUMMARY

Banana plugs are often used for hooking up AV systems. However, banana plugs generally require a user to unscrew a housing, insert the wire, tighten a set screw to secure the wire, and then screw back on the housing. As should be appreciated, this process is time consuming and difficult, especially for a DIYer. Unfortunately, there is not currently a way to quickly and easily make secure wire connections when a banana plug is used.

A unique banana plug design has been developed to enable quick and secure electrical connections. The banana plug includes a body configured to retain and secure a wire. The body further includes a lever configured to actuate an internal spring. In one example, the spring is made from aluminum. In another example, the spring is made from stainless steel. The lever generally moves the spring from a first or open position configured to receive a wire to a second or closed position configured to retain the wire. In one example, the spring includes an aperture configured to receive the wire when the lever is in the open position. The aperture is further configured to surround and retain the wire when the lever is in the closed position. The spring aperture is sized to receive wires ranging in size from 12-24 American wire gauge (AWG). In another example, the lever is perpendicular to the body of the banana plug in the open position and is parallel to the body of the banana plug in the closed position. In the open position, the lever applies a compression force to the spring. Generally, the compression force moves the spring aperture vertically (e.g., downward). Thus, the spring aperture is exposed and able to receive the wire. In the closed position, the lever is not in contact with the spring.

The banana plug further includes a busbar configured to transfer electricity through the plug. For example, the wire transfers electricity into the plug, along the busbar, and into a device. In one example, the busbar is made from highly conductive material, such as copper. In another example, the busbar is gold plated. In one embodiment, the busbar extends through the aperture of the spring. For example, the busbar and the spring aperture are configured to form a sandwich arrangement with the wire. As should be appreciated, this arrangement clamps the wire between the spring and the busbar in a secure connection.

In an example use case, a user begins by rotating the lever into the open position. As mentioned above, the lever applies force to the spring in the open position, thus exposing the spring aperture. The user then inserts the wire into the spring aperture via a wire opening in the body. Once the wire is within the spring aperture, the user rotates the lever into the closed position. As mention above, the lever does not apply force to the spring in the closed position, thus the spring aperture moves vertically upward, sandwiching the wire between the spring aperture and the busbar. As should be appreciated, once the wire is in contact with the busbar, the electrical connection is complete. For example, the banana plug may then be plugged in for use. To remove the banana plug from the wire, the user rotates the lever into the open position and pulls the wire out of the spring aperture.

The system and techniques as described and illustrated herein concern a number of unique and inventive aspects. Some, but by no means all, of these unique aspects are summarized below.

Aspect 1 generally concerns a system that includes a banana plug connector.

Aspect 2 generally concerns the system of any previous aspect in which the banana plug connector facilitates toolless connection of a wire.

Aspect 3 generally concerns the system of any previous aspect in which the banana plug includes a lever configured to actuate an internal spring.

Aspect 4 generally concerns the system of any previous aspect in which the lever actuates the spring from a first position configured to receive a wire to a second position configured to retain the wire.

Aspect 5 generally concerns the system of any previous aspect in which the spring includes an aperture configured to receive the wire in the first position.

Aspect 6 generally concerns the system of any previous aspect in which the aperture is configured to surround and retain the wire in the second position.

Aspect 7 generally concerns the system of any previous aspect in which the spring aperture is configured to direct the wire vertically upward into contact with a busbar when in the second position.

Aspect 8 generally concerns the system of any previous aspect in which the wire is contacted on one side via the busbar in the second position.

Aspect 9 generally concerns the system of any previous aspect in which the wire is contacted on an opposite side via an edge of the spring aperture in the second position.

Aspect 10 generally concerns the system of any previous aspect in which the lever applies a compression force to the spring in the first position.

Aspect 11 generally concerns the system of any previous aspect in which the compression force is configured to compress the spring to allow access to the spring aperture in the first position.

Aspect 12 generally concerns the system of any previous aspect in which the banana plug includes a body portion defining an integral channel.

Aspect 13 generally concerns the system of any previous aspect in which the lever is configured to rest within the integral channel when in the second position to prevent accidental rotation of the lever.

Aspect 14 generally concerns the system of any previous aspect in which the spring includes an aperture configured to retain the wire within the banana plug connector.

Aspect 15 generally concerns the system of any previous aspect in which the aperture includes an edge configured to direct the wire vertically upward into contact with a busbar in a sandwich arrangement.

Aspect 16 generally concerns the system of any previous aspect in which the sandwich arrangement is configured to retain the wire within the banana plug connector.

Aspect 17 generally concerns the system of any previous aspect in which the banana plug includes a busbar configured to transfer electricity through the plug.

Aspect 18 generally concerns the system of any previous aspect in which the busbar extends through the aperture of the spring.

Aspect 19 generally concerns the system of any previous aspect in which the busbar and spring aperture are configured to form a sandwich arrangement with the wire when in the second position.

Aspect 20 generally concerns the system of any previous aspect in which the sandwich arrangement is configured to securely retain the wire in the second position.

Aspect 21 generally concerns the system of any previous aspect in which the banana plug accepts 12-24 American wire gauges (AWG) wire.

Aspect 22 generally concerns a method of using or manufacturing the system of any previous aspect.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
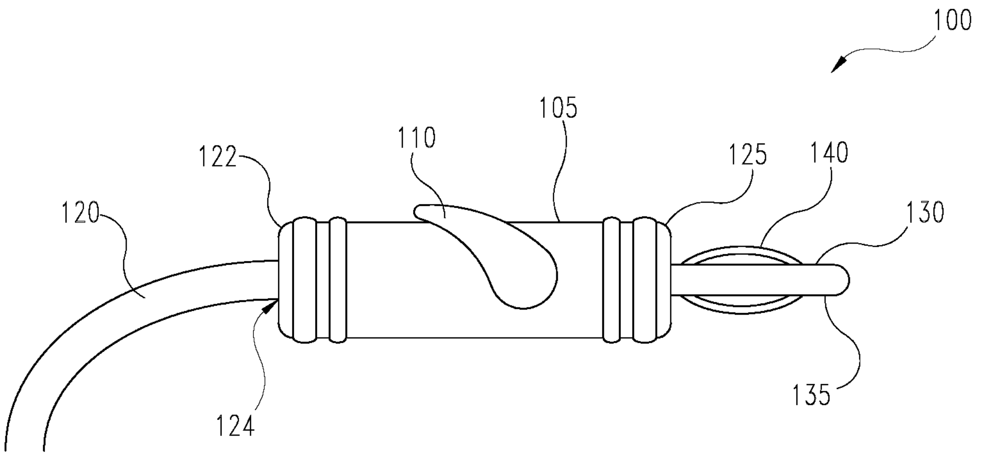
FIG. 1 is a side view of a banana plug including a wire according to one example.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 shows a side view of a banana plug 100 according to one example. The banana plug 100 can be used to make electrical connections for a wide variety of electrical equipment such as AV equipment. The banana plug 100 includes a body 105 with a lever 110 configured to enable manual connection and disconnection of a wire without the use of tools. To reduce the risk of electrical shorts, the body 105 in one version is made from electrically insulative material, such as plastic or other polymeric material. In another version, the body 105 is made from an electrically conductive material, such as a metallic material, to promote grounding. When made of conductive material, insulating material is positioned to electrically isolate the body 105 from other electrically conductive material of the banana plug 100. In the illustrated example, the body 105 has an elongated cylindrical shape to conserve space. The body 105 in other examples can be shaped differently. For instance, the body 105 can have rectangular and/or polygonal shape.

The lever 110 extends from the body 105 and is configured to alternate between one or more positions. In one position, the lever 110 is configured to receive a wire 120. In another position, the lever 110 is configured to secure the wire 120 within the body 105. To facilitate connection between the banana plug 100 and the wire 120, the wire 120 is inserted into a female portion 124 of the body 105 located on a first end 122 of the body 105. In one example, the female portion 124 is sized to receive wire 120 from 0-40 American Wire Gauge (AWG). In another example, the female portion 124 is sized to receive wire 120 from 12-24 AWG.

Located on a second end 125 of the body 105 is a male portion 130. The male portion 130 includes a pin 135 with one or more leaves 140. The male portion 130 is configured to plug into a receptacle in order to transfer electricity from the wire 120 into the receptacle. The leaves 140 are configured to secure the male portion 130 within the receptacle via a biasing force. For example, the leaves 140 act as leaf springs and/or another form of spring. In another example, the male portion 130 does not include any leaves 140, instead an interior portion of the receptacle includes one or more leaves. The male portion 130, pin 135, and the leaves 140 are made from an electrically conductive material. In one example, the male portion 130, pin 135, and leaves 140 are made from copper. In another example, the male portion 130, pin 135, and leaves 140 are gold plated. In yet another example, the male portion 130, pin 135, and leaves 140 are made from another electrically conductive material. In one version, the male portion 130 is removable and/or replaceable within the body 105 of the banana plug 100.

Figure 2:
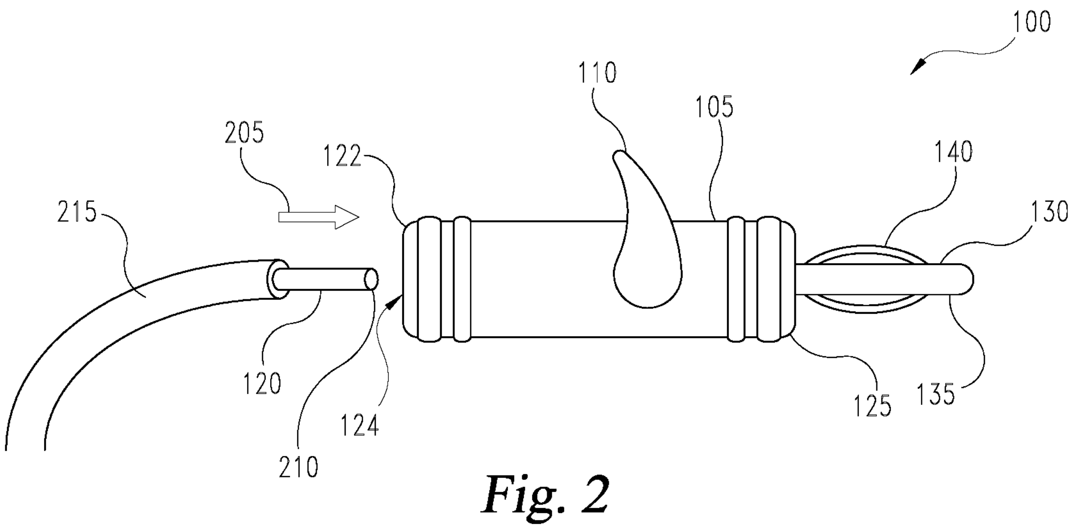
FIG. 2 is an exploded view of the wire being inserted into the banana plug of FIG. 1.

FIG. 2 shows an example of insertion of the wire 120 into the banana plug 100 via the female portion 124. As indicated by arrow 205, the wire 120 is first inserted into the female portion 124 of the body 105. The wire 120 includes an uninsulated portion 210 and an insulated portion 215. The uninsulated portion 210 is inserted into the female portion 124 of the banana plug 100 to facilitate a strong electrical connection between the wire 120 and the banana plug 100. The insulated portion 215 is configured to protect the wire 120 and prevent electrical short circuits and/or unwanted electrical contact. Once the wire 120 is inserted into the female portion 124, the lever 110 is actuated into the securing position to lock the wire 120 within the body 105. In the illustrated example, the attachment of the banana plug 100 to the wire 120 is done without the use of tools.

Figure 3:
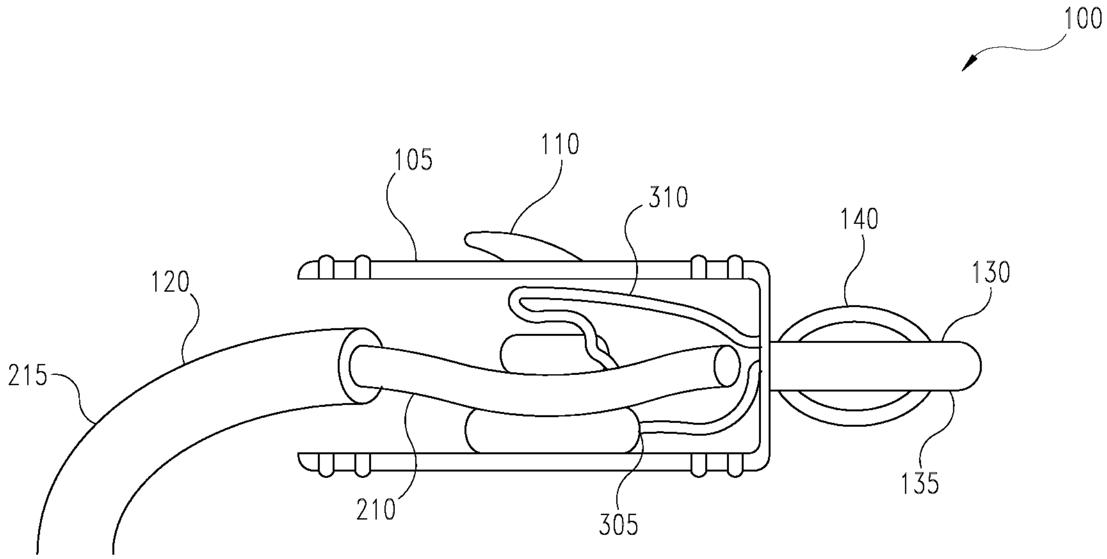
FIG. 3 is a cross-sectional view of the banana plug of FIG. 1 with the wire connected to the banana plug.

FIG. 3 shows a cross-sectional view of the banana plug 100 showing internal components of the body 105. The body 105 contains a busbar 305 and a spring 310. The busbar 305 is configured to enable the flow of electricity from the uninsulated portion 210 of the wire 120 into the male portion 130 via the busbar 305. The spring 310 is configured to secure the wire 120 within the body 105 via a compression force applied to the wire 120. The spring 310 is configured to compress the uninsulated portion 210 of the wire 120 between the busbar 305 and the spring 310. Actuation of the spring 310 is accomplished via the lever 110. In one example, a small amount of the insulated portion 215 is inserted into the female portion 124 to prevent unwanted exterior contact with the uninsulated portion 210. As should be appreciated, the uninsulated portion 210 is electrically conductive and the insulated portion 215 is not electrically conductive. Thus, the uninsulated portion 210 is configured to transfer electricity from the wire 120 into the busbar 305 and through the male portion 130 into the receptacle.

Figure 4:
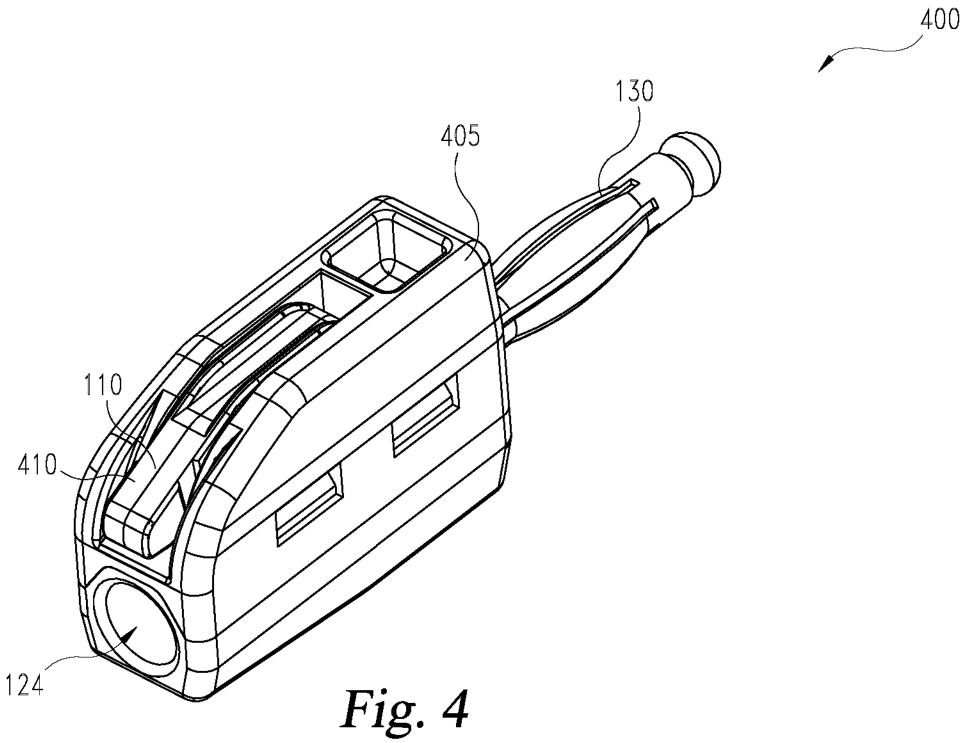
FIG. 4 is a perspective view of a banana plug according to another example.
Figure 5:
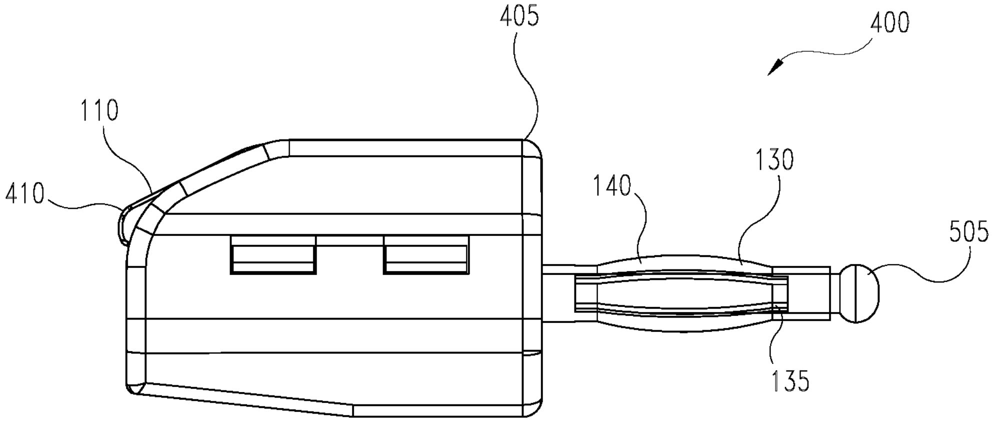
FIG. 5 is a side view of the banana plug of FIG. 4 with a lever in a closed position.

FIG. 4 depicts a banana plug 400 according to another example. The banana plug 400 has the lever 110 that is pivotally coupled to a body 405. In FIGS. 4 and 5, the banana plug 400 is shown with the lever 110 in a second or a closed position 410. The closed position 410 is configured to secure and/or lock the wire 120 within the body 405 of the banana plug 400. Thus, in the closed position 410, a compression force is generated via the spring 310 on the wire 120. As shown in FIG. 5, the male portion 130 includes a detent 505 located at an end of the male portion 130. The detent 505 is configured to provide additional security to hold the banana plug 400 within the receptacle. The detent 505 is configured to mate with a corresponding opening within the receptacle to further secure the male portion 130 within the receptacle. In other variations, the banana plug 400 does not have the detent 505.

Figure 6:
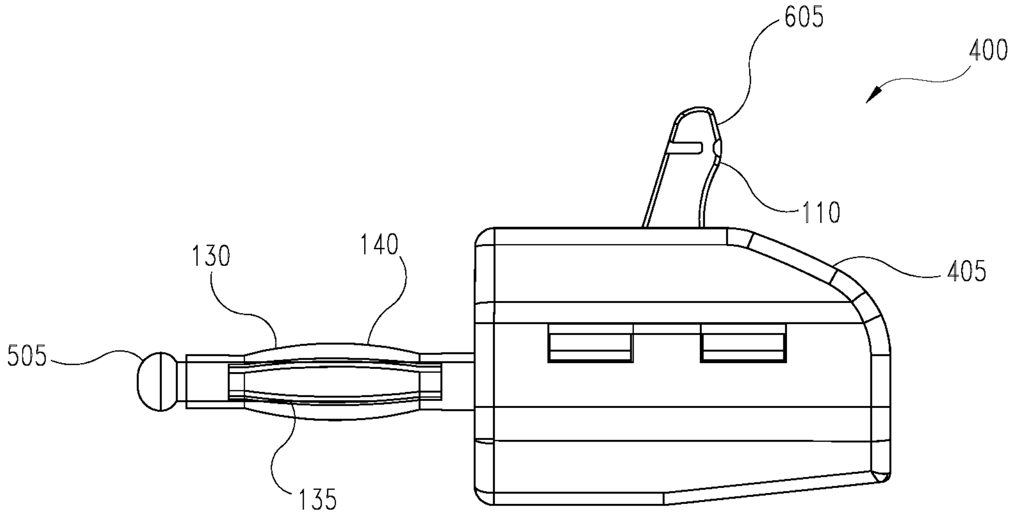
FIG. 6 is a side view of the banana plug of FIG. 4 with the lever in an open position.

Turning to FIG. 6, the banana plug 400 is shown with the lever 110 in a first or an open position 605. When the lever 110 is in the open position 605, the banana plug 400 is configured to enable insertion of the wire 120 into the body 405. In the closed position 410 described previously, the wire 120 is prevented from fully entering the body 405. However, in the open position 605, the wire 120 is able to fully enter the body 405. As should be appreciated, by actuating the lever 110 from the closed position 410 to the open position 605, the banana plug 400 facilitates a manual or toolless connection to the wire 120. The toolless connection allows for time and cost savings. Additionally, the toolless connection facilitates easy replacement of the wire 120 and/or the banana plug 400 in the event of a failure.

Figure 7:
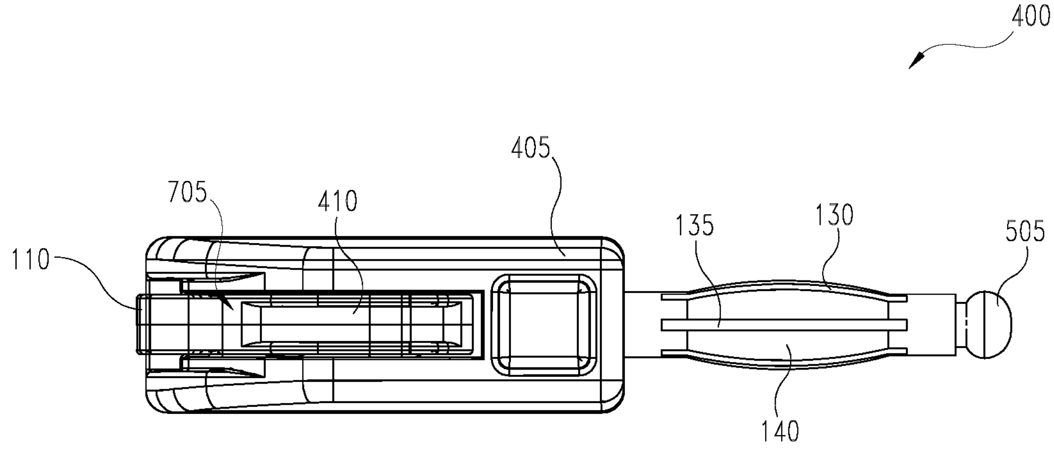
FIG. 7 is a top view of the banana plug of FIG. 4.
Figure 8:
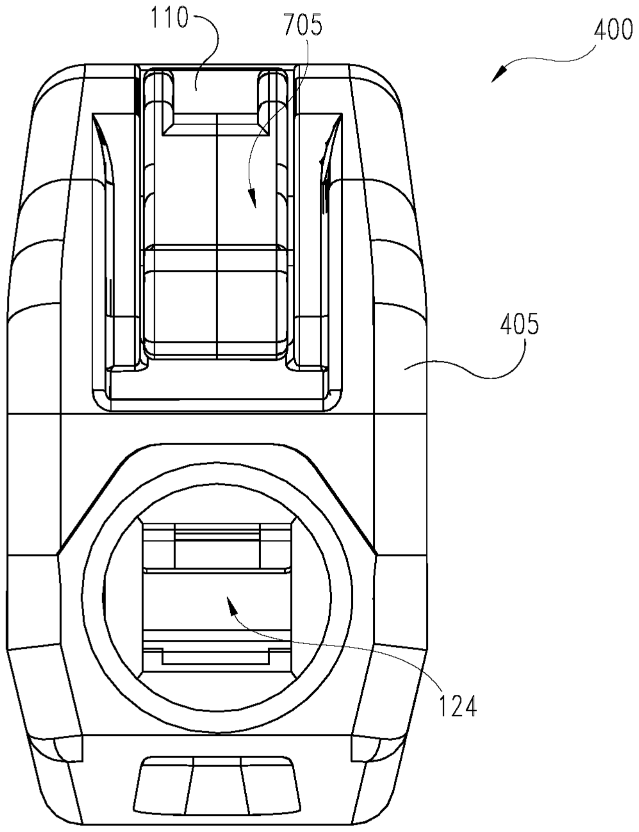
FIG. 8 is an enlarged end view of the banana plug of FIG. 4.

FIGS. 7 and 8 show alternate views of the banana plug 400 with the lever 110 in the closed position 410. As shown, the body 405 includes a channel 705. The channel 705 is configured to retain the lever 110 when in the closed position 410. The channel 705 is configured to prevent accidental actuation of the lever 110. As should be appreciated, preventing accidental actuation of the lever 110 extends the life of the banana plug 400.

Figure 9:
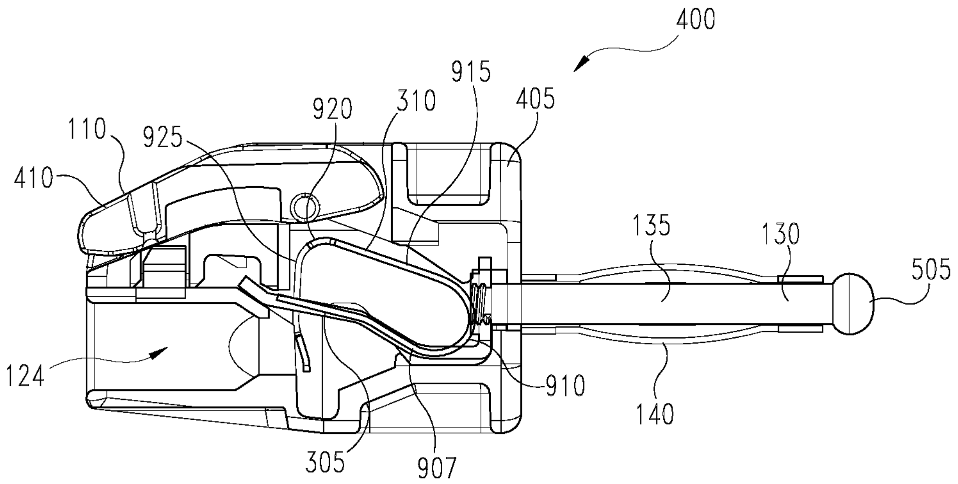
FIG. 9 is a cross-sectional view of the banana plug of FIG. 4 with the lever in the closed position.

FIG. 9 shows a cross-sectional view of the banana plug 400 with the lever 110 in the closed position 410. The spring 310 is in a resting position 905 when the lever 110 is in the closed position 410. In the resting position 905, there is no external force applied to the spring 310. When the lever 110 is in the closed position 410, the spring 310 is in a natural and/or resting state. The spring 310 includes a base 907 configured to surround a portion of the busbar 305. The base 907 curves into a fulcrum 910 configured to act as a pivot point for an arm 915 of the spring 310. The arm 915 includes a bend 920 extending into a leg 925. In one example, the bend 920 defines an angle of 15-180 degrees.

Figure 10:
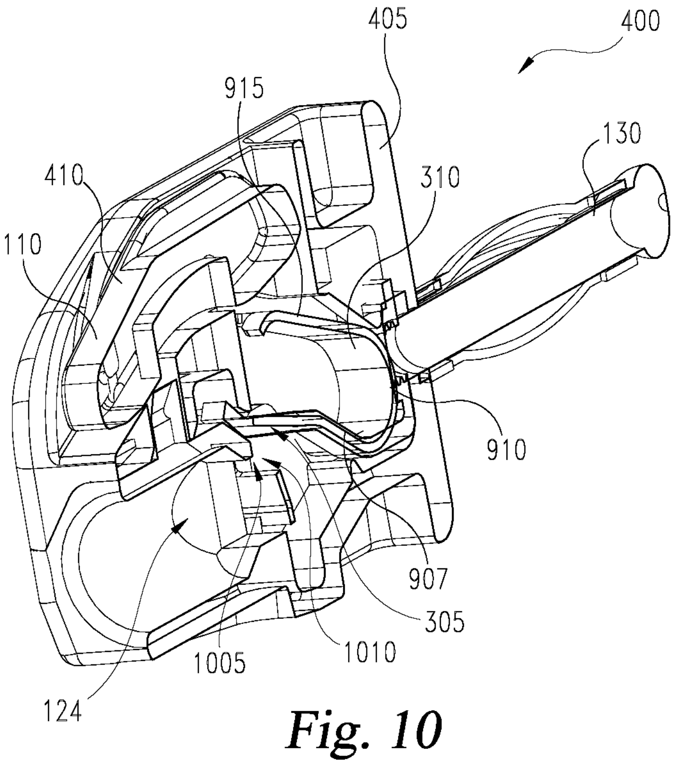
FIG. 10 is a cross-sectional view of the banana plug of FIG. 4.

Shown in FIG. 10 is another view of the cross-section of the banana plug 400. As can be seen, the spring 310 defines an aperture 1005 through which the busbar 305 extends. The aperture 1005 is defined on all sides by the leg 925 of the spring 310, such that the aperture 1005 forms a window. The aperture 1005 is configured to receive the wire 120 when the lever 110 is in the open position 605.

The aperture 1005 defines a gap 1010 between the busbar 305 and an edge of the spring 310. The gap 1010 is configured to expand and/or contract based on the position of the lever 110. The gap 1010 is configured to expand in order to receive the wire 120 when the lever 110 is in the open position 605. The gap 1010 is configured to contract in order to clamp the wire 120 between the busbar 305 and the spring 310 when the lever 110 is in the closed position 410.

Figure 11:
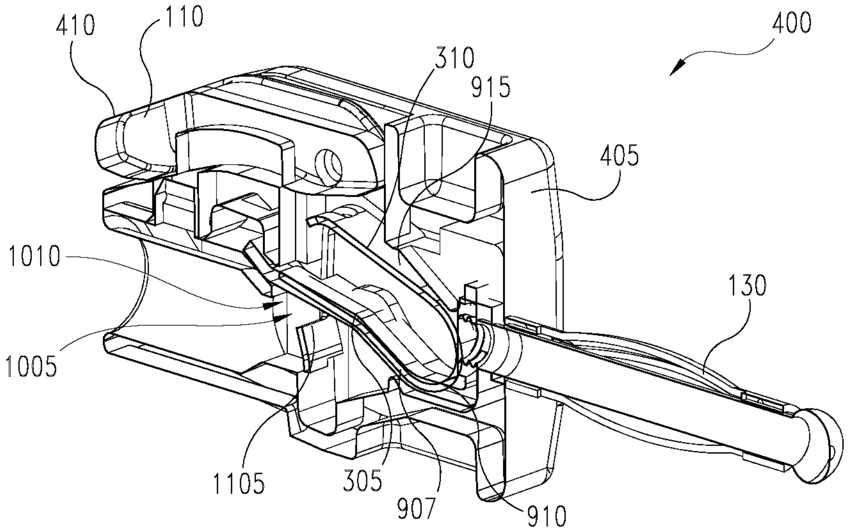
FIG. 11 is a cross-sectional view of the banana plug of FIG. 4.

FIG. 11 shows another view of the banana plug 400. As can be seen, the gap 1010 is formed within the aperture 1005 of the spring 310 between an edge 1105 of the spring 310 and the busbar 305. The wire 120 is compressed via the edge 1105 against the busbar 305 when the lever 110 is in the closed position 410 to form a solid connection between the banana plug 400 and the wire 120. Additionally, the wire 120 is configured to maintain contact with the busbar 305 via the upward pressure of the edge 1105 to prevent short circuiting of the electrical connections. Thus, electricity is able to flow through the banana plug 400 without interference. In the illustrated embodiment, the edge 1105 is configured to contact one side of the wire 120 while the busbar 305 is configured to contact an opposing side of the wire 120 to form a sandwich arrangement.

Figure 12:
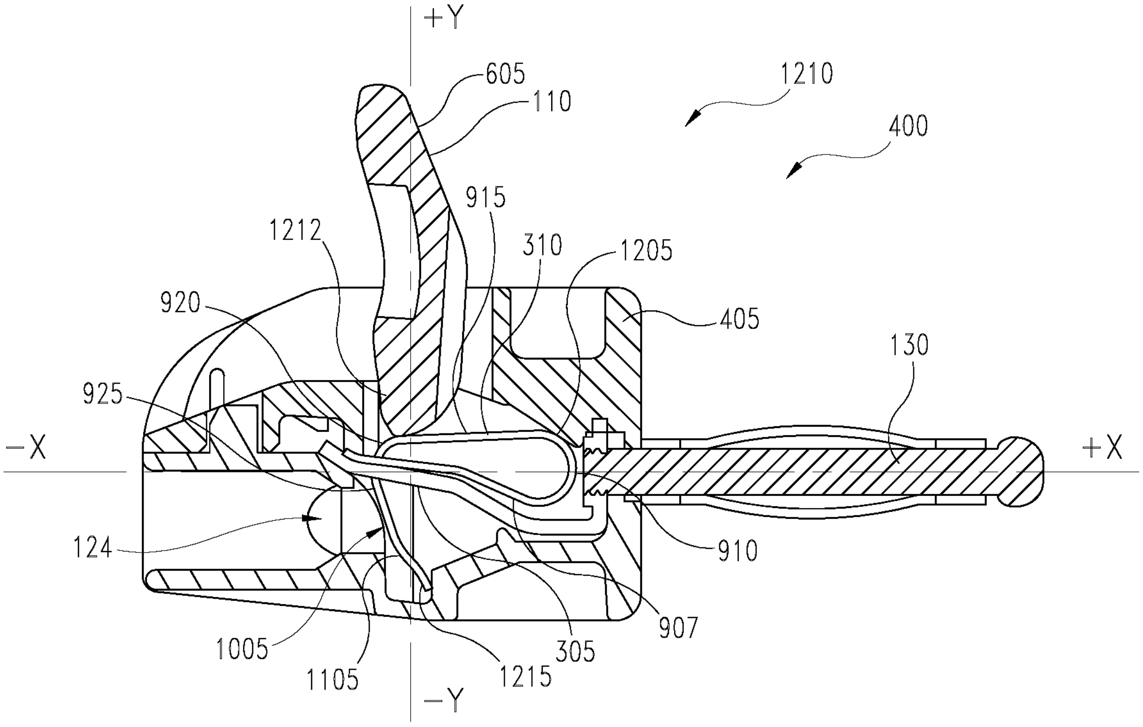
FIG. 12 is a cross-sectional view of the banana plug of FIG. 4 with the lever in the open position.

FIG. 12 shows a cross-sectional view of the banana plug 400 with the lever 110 in the open position 605. The spring 310 is in a compressed position 1205 when the lever 110 is in the open position 605. As the lever 110 moves from the closed position 410 to the open position 605, a lobe 1212 of the lever 110 is configured to engage with the arm 915 of the spring 310 to apply a compression force to the spring 310. The force pivots the arm 915 about the fulcrum 910. As the arm 915 pivots about the fulcrum 910, the leg 925 of the spring 310 moves downward, in the −Y direction as shown by reference axis 1210. The leg 925 further includes a tongue 1215 at one end. As should be appreciated, downward movement of the leg 925 and tongue 1215 expands the gap 1010 to receive the wire 120. In one example, the gap 1010 is adjusted based on the size of the wire 120. For example, the gap 1010 is adjusted to receive 12-24 AWG wire.

As the lever 110 is moved from the open position 605 to the closed position 410, the lobe 1212 loses contact with the arm 915 of the spring 310 as the force on the spring 310 is removed. As force is removed, the arm 915 begins to pivot upward about the fulcrum 910, in the +Y direction. Thus, the leg 925 and the tongue 1215 move upward, in the +Y axis as shown by the reference axis 1210. As the leg 925 and the tongue 1215 move upward, the edge 1105 contacts an underside of the wire 120 and pushes the wire 120 in the +Y axis until the wire 120 contacts the busbar 305.

The edge 1105 of the spring 310 then applies a constant compression and/or biasing force to the wire 120 via sandwiching the wire 120 between the edge 1105 and the busbar 305. The biasing force is configured to retain the wire 120 within the banana plug 400. To remove the wire 120, the user moves the lever 110 from the closed position 410 to the open position 605, such that the gap 1010 is expanded and the edge 1105 loses contact with the wire 120. The user then pulls the wire 120 out of the female portion 124 of the banana plug 400.

Figure 13:
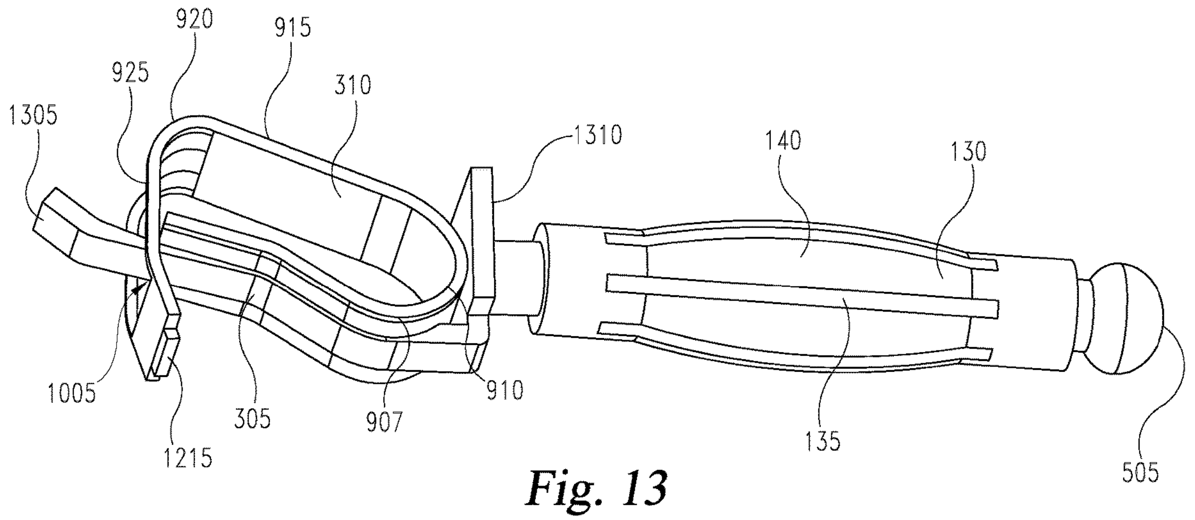
FIG. 13 is a perspective view of a portion of the banana plug of FIG. 4.

FIG. 13 shows the male portion 130 integrally connected to the busbar 305 and spring 310. In one example, the busbar 305 and the spring 310 are connected to the male portion 130 via a flange 1310. In another example, the busbar 305 is connected to the male portion 130 via the flange 1310 and the spring 310 is an integral component of the male portion 130.

The busbar 305 further includes a guide 1305. The guide 1305 is configured to extend through the aperture 1005 of the spring 310. The guide 1305 is configured to guide the wire 120 into the aperture 1005 of the spring 310. The busbar 305 extends through the aperture 1005 to enable contact between the busbar 305 and the wire 120 during use. In one version, the busbar 305 is an integral component of the spring 310, such that the busbar 305 and the spring 310 are fixed together in a unitary component. For example, the busbar 305 is configured to rest within and/or partially within the base 907 of the spring 310. In one example, the busbar 305 is made from a conductive material while the spring 310 is made from a nonconductive material. In another example, both the busbar 305 and spring 310 are made from an electrically conductive material.

Figure 14:
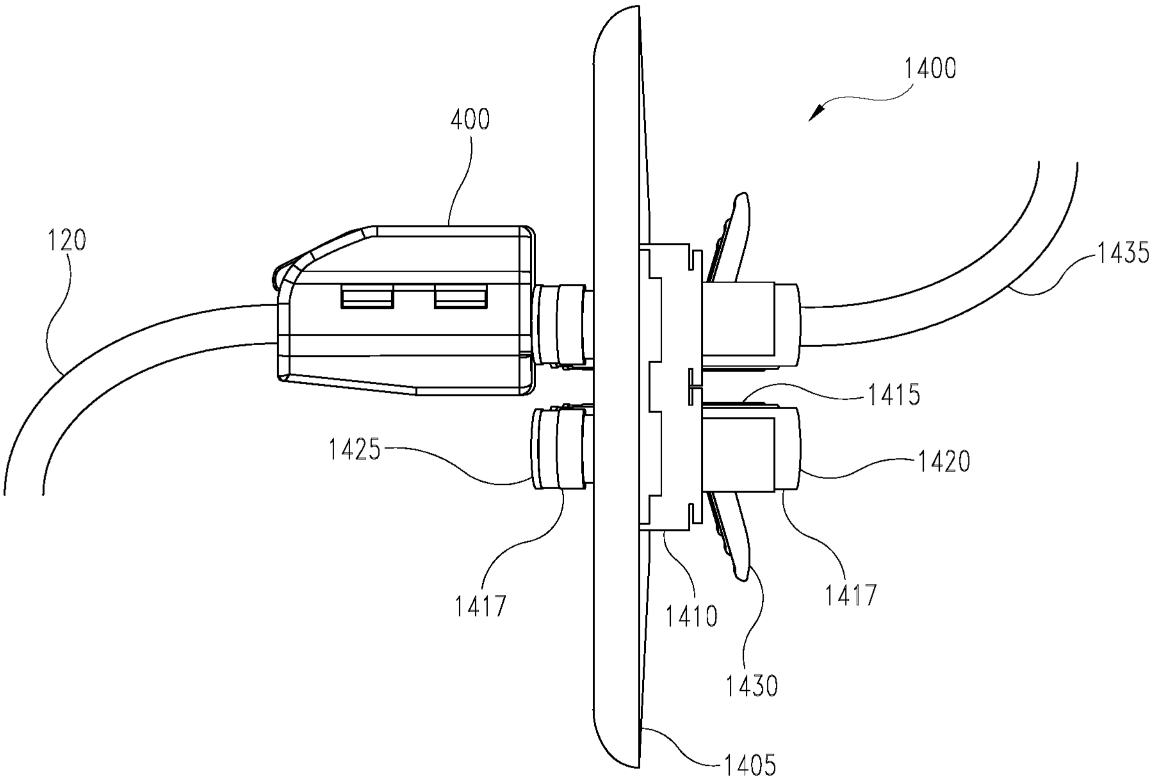
FIG. 14 is a top view of a binding post system.

FIG. 14 shows an example of a binding post system 1400. The binding post system 1400 is configured to enable a user to connect electrical components, such as wires, banana plugs, spade connectors, and/or other electrical connectors. The binding post system 1400 is configured for use with an outlet cover 1405 and an outlet 1410. The binding post system 1400 includes one or more binding posts 1415, which are integral to the outlet 1410. In another example, the outlet 1410 includes a series of binding posts 1415, such as two (2), four (4), six (6), eight (8), and/or other numbers of binding posts 1415.

The binding post 1415 includes a body 1417 with a first end 1420 and a second end 1425. The first end 1420 includes a lever 1430 to facilitate a toolless connection between the first end 1420 of the binding post 1415 and a wire 1435. The lever 1430 of the binding post 1415 is configured to operate similarly to the lever 110 of the banana plug 100 described previously. For example, the lever 1430 is configured to actuate from an open position configured to receive the wire 1435 to a closed position configured to retain the wire 1435. Opposite the first end 1420, the second end 1425 is configured to receive the banana plug 400 via a plug-in style connection. In another version, the second end 1425 is configured to receive wire directly, without the banana plug 400. As should be appreciated, the binding post system 1400 facilitates the flow of electricity from the wire 120 to the wire 1435 via the banana plug 400 and the binding post 1415.

Figure 15:
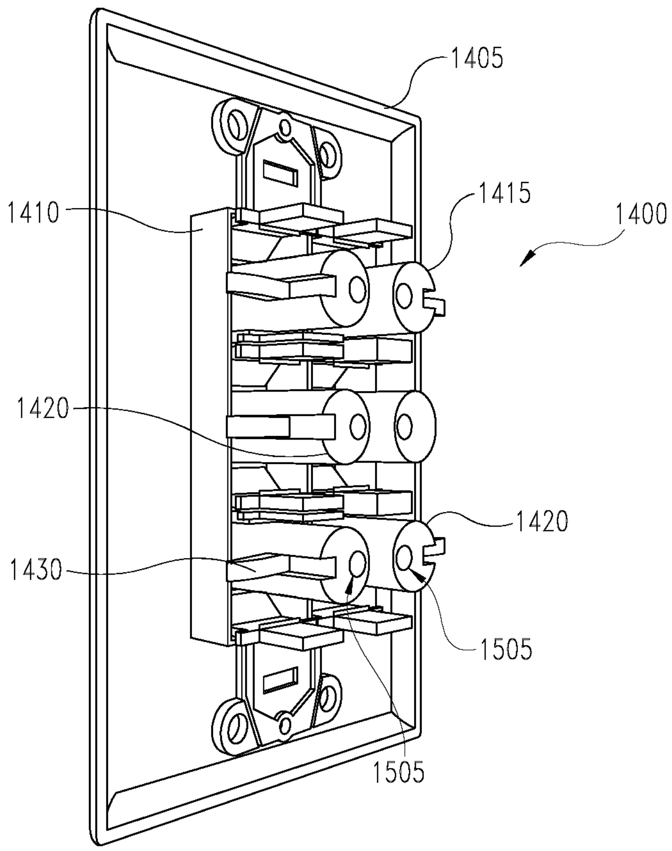
FIG. 15 is a rear perspective view of the binding post system of FIG. 14.

FIG. 15 shows another example of the binding post system 1400. The first end 1420 of the binding post 1415 is shown to include a female portion 1505. The female portion 1505 is configured to receive wire, banana plugs, and/or other electrical connectors to facilitate a toolless connection between the binding post system 1400 and the electrical connector. For example, a user inserts a wire and/or banana plug into the female portion 1505 of the binding post 1415 and then actuates the lever 1430 to secure the wire and/or banana plug within the female portion 1505. The lever 1430 is designed to function in a similar manner to the lever 110 of the banana plug 100. In one version, the female portion 1505 is configured to accept wire from 12-24 AWG.

Figure 16:
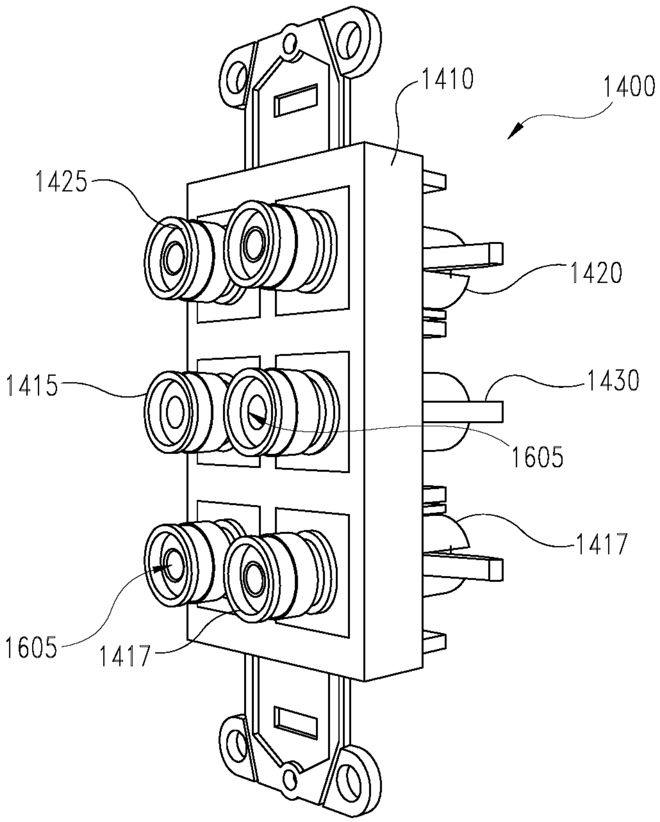
FIG. 16 is a front perspective view of the binding post system of FIG. 14.

FIG. 16 shows yet another view of the binding post system 1400. The second end 1425 of the binding post 1415 is shown to include a female portion 1605. The female portion 1605 is configured to receive wire, banana plugs, spade connectors, and/or other electrical connectors. However, the second end 1425 of the binding post 1415 does not include a lever 1430, such that the second end 1425 of the binding post 1415 functions differently than the first end 1420 of the binding post 1415. In another version, both the first end 1420 and the second end 1425 of the binding post 1415 include separate levers 1430 configured to enable toolless connection of one or more electrical connectors. The female portion 1605 is configured to accept wire from 12-24 AWG.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"About" with reference to numerical values generally refers to plus or minus 10% of the stated value. For example, if the stated value is 4.375, then use of the term "about 4.375" generally means a range between 3.9375 and 4.8125.

"Adhesive" generally refers to any non-metallic substance applied to one or both surfaces of two separate parts that binds them together and resists their separation. For example, an adhesive can bond both mating surfaces through specific adhesion (e.g., molecular attraction), through mechanical anchoring (e.g., by flowing into holes in porous surfaces), and/or through fusion (e.g., partial solution of both surfaces in the adhesive or its solvent vehicle). Some non-limiting examples of adhesives include liquid adhesives, film adhesives, resin adhesives, rubber adhesives, silicone-based adhesives, mastics, metal-to-metal adhesives, plastic adhesives, rubber adhesives, sprayable adhesives, and hot melt adhesives, to name just a few.

"American Wire Gauge (AWG)" generally refers to a logarithmic stepped standardized wire gauge system referring to the diameters of round, solid, nonferrous, electrically conducting wire. Dimensions of the wires are given in ASTM standard B258. Increasing gauge numbers denote decreasing wire diameters. The AWG tables are for a single, solid, round conductor. The AWG of a stranded wire is determined by the cross-sectional area of the equivalent solid conductor. Because there are also small gaps between the strands, a stranded wire generally has a slightly larger overall diameter than a solid wire with the same AWG.

"Banana Plug" or "Banana Connector" generally refers to an electrical connector including a body and a cylindrical metal pin with one or more springs and/or leaves oriented lengthwise along the pin. The leaves are biased to bulge and/or bow outwards from the pin. The leaves are configured to apply pressure to an interior of a socket and/or receptacle when the banana plug is inserted. Pressure from the leaves improves the electrical connection between the plug and socket. In alternate versions, the pin does not include any leaves, but instead the receptacle and/or socket includes leaves configured to engage the pin. Opposite the pin, the banana plug includes an aperture configured to receive a wire and/or another banana plug pin in a "stackable plug" configuration. The wire and/or pin is held within the aperture via one or more fasteners, solder, crimping, screws, and/or via a snap-fit connection. In some applications, the banana plug includes insulated sheathing configured to surround the pin. The sheathing is configured to prevent accidental electrocution and/or shock. In some examples, the banana plug is configured for use with a five-way and/or universal binding post. Other examples of banana plugs include: PL-259 plugs, miniature banana connectors, pin tip jacks, wander plugs, and/or other similar type electrical connectors.

"Cantilever Spring" generally refers to a spring fixed only at one end. In one non-limiting example, the cantilever spring is in the form of a flat spring that is anchored at one and the other end extends freely away from the anchored end.

"Channel" generally refers to a long, narrow groove in a surface of an object.

"Conductor" or "Conductive Material" generally refers to a material and/or object that allows the free flow of an electrical charge in one or more directions such that relatively significant electric currents will flow through the material under the influence of an electric field under normal operating conditions. By way of non-limiting examples, conductors include materials having low resistivity, such as most metals (e.g., copper, gold, aluminum, etc.), graphite, and conductive polymers.

"Contact" generally refers to a condition and/or state where at least two objects are physically touching. For example, contact requires at least one location where objects are directly or indirectly touching, with or without any other member(s) material in between.

"Detent" or "Detent Mechanism" generally refers to a device configured to position and hold one mechanical part in relation to another in a manner such that the device can be released by force applied to one of the parts. Some non-limiting examples of detents include a catch, dog, or spring-operated ball.

"Electrical Connection" generally refers a connection between two objects that allows a flow of electric current and/or electric signals.

"Fastener" generally refers to a hardware device that mechanically joins or otherwise affixes two or more objects together. By way of non-limiting examples, the fastener can include bolts, dowels, nails, nuts, pegs, pins, rivets, screws, buttons, hook and loop fasteners, and snap fasteners, to just name a few.

"Female" generally refers to a structure that connects to another structure that includes hollow portions for receiving portions of a corresponding male connector.

"Gauge" generally refers to the standard American Wire Gauge ("AWG") cross-sectional size or its cross-sectional area equivalent. For example, 14 gauge, or AWG 14, corresponds to a circle having a diameter of 1.63 millimeters. For example, 15 gauge, or AWG 15, corresponds to a circle having a diameter of 1.45 millimeters.

"Hole" generally refers to a hollow portion through a solid body, wall or a surface. A hole may be any shape. For example, a hole may be, but is not limited to, circular, triangular, or rectangular. A hole may also have varying depths and may extend entirely through the solid body or surface or may extend through only one side of the solid body.

"Insulator" or "Insulative Material" generally refers to a material and/or object whose internal electric charges do not flow freely such that very little electric current will flow through the material under the influence of an electric field under normal operating conditions. By way of non-limiting examples, insulator materials include materials having high resistivity, such as glass, paper, ceramics, rubber, and plastics.

"Leaf Spring" generally refers to a type of spring made from one or more strips of elastic material. In one form, multiple strips of elastic material are laminated together to form the leaf spring, and in other forms, a single strip of elastic material, such metal and/or plastic, forms the leaf spring. The leaf springs can be curved or substantially straight. The leaf spring can further include a frame to which the ends of the strips are attached.

"Lever" generally refers to a simple machine including a beam, rod, or other structure pivoted at a fulcrum, such as a hinge. In one form, the lever is a rigid body capable of rotating on a point on itself. Levers can be generally categorized into three types of classes based on the location of fulcrum, load, and/or effort. In a class 1 type of lever, the fulcrum is located in the middle such that the effort is applied on one side of the fulcrum and the resistance or load on the other side. For class 1 type levers, the mechanical advantage may be greater than, less than, or equal to 1. Some non-limiting examples of class 1 type levers include see-saws, crowbars, and a pair of scissors. In a class 2 type of lever, which is sometimes referred to as a force multiplier lever, the resistance or load is located generally near the middle of the lever such that the effort is applied on one side of the resistance and the fulcrum is located on the other side. For class 2 type levers, the load arm is smaller than the effort arm, and the mechanical advantage is typically greater than 1. Some non-limiting examples of class 2 type levers include wheelbarrows, nutcrackers, bottle openers, and automobile brake pedals. In a class 3 type lever, which is sometimes referred to as a speed multiplier lever, the effort is generally located near the middle of the lever such that the resistance or load is on one side of the effort and the fulcrum is located on the other side. For class 3 type levers, the effort arm is smaller than the load arm, and the mechanical advantage is typically less than 1. Some non-limiting examples of class 3 type levers include a pair of tweezers and the human mandible.

"Male" generally refers to a structure that connects to another structure that includes portions that fill or fit inside the hollow portion of a corresponding female connector.

"Manual" generally refers work done by human hand and not via machine, tool, and/or electronics.

"Metallic" generally refers to a material that includes a metal, or is predominately (50% or more by weight) a metal. A metallic substance may be a single pure metal, an alloy of two or more metals, or any other suitable combination of metals. The term may be used to refer to materials that include nonmetallic substances. For example, a metallic cable may include one or more strands of wire that are predominately copper sheathed in a polymer or other non-conductive material.

"Plastic" generally refers to a group of materials, either synthetic, semi-synthetic, and/or naturally occurring, that may be shaped when soft and then hardened to retain the given shape. Plastics are polymers. A polymer is a substance made of many repeating units. Plastics are generally insulators.

"Polymer" generally refers to a material characterized by a molecular structure formed from the repetition of subunits bonded together. Examples include, but are not limited to, plastics or rubber.

"Snap Fastener" generally refers to a fastening device including a male portion and a female portion. The male portion typically includes a protrusion or ball on one component, while the female portion typically includes a recess or a socket configured to accept and secure the male portion. Typically, a snap fastener is mated together by a pushing force and separated by a pulling force.

"Toolless" generally refers to an activity not having and/or requiring tools in order to perform the activity. Typically, the act can be performed manually be an individual.

"Wire" generally refers to elongated electrically conductive metal. This includes an individual strand, multiple strands (twisted, braided and/or not), traces, strips and other cross-sectional geometries. In some examples, wire is uninsulated wire, such as bare wire without a coating and/or plating. In other examples, wire is insulated wire with a coating of non-conductive material surrounding the wire. In some examples, insulated wire is coated with plastic, fluoropolymer, and/or rubber materials.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS

100 banana plug
105 body
110 lever
120 wire
122 first end
124 female portion
125 second end
130 male portion
135 pin
140 leaves
205 arrow
210 uninsulated portion
215 insulated portion
305 busbar
310 spring
400 banana plug
405 body
410 closed position
505 detent
605 open position
705 channel
905 resting position
907 base
910 fulcrum
915 arm
920 bend
925 leg
1005 aperture
1010 gap
1105 edge
1205 compressed position
1210 reference axis
1212 lobe
1215 tongue
1305 guide
1310 flange
1400 binding post system
1405 outlet cover
1410 outlet
1415 binding post
1417 body
1420 first end
1425 second end
1430 lever
1435 wire
1505 female portion
1605 female portion

What is claimed is:

1. A system, comprising:
a banana plug including
a pin,
a spring coupled to the pin, the spring having an arm, the arm defining an aperture,
wherein the spring at the aperture has a clamping portion configured to secure a wire against the spring,
wherein the spring has an opened position configured to receive the wire through the aperture,
wherein the spring has a closed position where the wire is clamped to the spring, and
a lever configured to actuate the spring to the opened position.

2. The system of claim 1, wherein the spring is biased to the closed position.

3. The system of claim 1, wherein the pin has one or more leaves bowing away from the pin.

4. The system of claim 1, wherein the lever is configured to apply a compressive force to the spring in an actuation position to actuate the spring to the opened position.

5. The system of claim 4, wherein the lever is configured to release the compressive force in a released position to release the spring to the closed position.

6. The system of claim 1, further comprising:
a binding post; and
wherein the banana plug is plugged into the binding post.

7. The system of claim 6, wherein:
the binding post has a binding post spring;
the binding post spring defines a binding post spring aperture with a binding post clamping portion configured to secure a binding post wire with the binding post spring;
the binding post spring has an opened position configured to receive the binding post wire through the binding post spring aperture;
the binding post spring has a closed position where the binding post wire is clamped to the binding post spring;
the binding post has a binding post lever; and
the binding post lever is configured to actuate the binding post spring to the opened position.

8. The system of claim 1, wherein:
the spring has a guiding portion;
the guiding portion extends through the aperture in the arm of the spring; and
the clamping portion is configured to direct the wire into contact with the guiding portion when
the spring is in the closed position.

9. The system of claim 8, wherein:
the guiding portion includes a busbar;
the busbar having a flange to which the pin is attached; and
the busbar being configured to provide an electrical connection between a wire and the pin.

10. The system of claim 8, wherein:
the clamping portion of the spring at the aperture is positioned opposite to the guiding portion; and
the wire is sandwiched between the clamping portion and the guiding portion when the spring is at the closed position.

11. The system of claim 1, wherein:
the banana plug has a body; and
the pin extends from the body.

12. The system of claim 11, wherein:
the body defines a channel; and
the channel is configured to retain the lever to prevent accidental rotation of the lever.

13. The system of claim 12, wherein the lever is configured to extend out of the channel when pivoted to compress the spring to the open position.

14. A system, comprising:
a binding post including
an outlet end,
a spring coupled to the outlet end, the spring having an arm, the arm defining an aperture,
wherein the spring at the aperture has a clamping portion configured to secure a wire against the spring,
wherein the spring has an opened position configured to receive the wire through the aperture,
wherein the spring has a closed position where the wire is clamped to the spring, and
a lever configured to actuate the spring to the opened position.

15. The system of claim 14, further comprising:
an outlet cover; and
wherein the binding post is coupled to the outlet cover.

16. The system of claim 14, further comprising:
a banana plug including a lever configured to actuate an internal spring; and
wherein the banana plug is plugged into the binding post.

17. A method, comprising:
opening an aperture in a spring of an electrical connector to an open position by actuating the spring with a lever of the electrical connector;
inserting a wire through the aperture in the spring;
rotating the lever to a released position to release the spring to a closed position where the wire in the aperture is clamped by the spring;
wherein the electronical connector has a pin; and
inserting the pin into a binding post.

18. The method of claim 17, wherein the electrical connector is a banana plug.

19. The method of claim 18, further comprising: plugging the banana plug into the binding post.

* * * * *